United States Patent
Mutoh et al.

[11] Patent Number: 5,650,700
[45] Date of Patent: Jul. 22, 1997

[54] ELECTRIC VEHICLE TORQUE CONTROLLER

[75] Inventors: Nobuyoshi Mutoh, Katsuta; Taizou Miyazaki, Hitachi; Ryoso Masaki, Hitachi; Tsutomu Ohmae, Hitachi; Sanshiro Obara, Toukai-mura, all of Japan

[73] Assignee: Hitachi, Ltd., Japan

[21] Appl. No.: 426,116

[22] Filed: Apr. 20, 1995

Related U.S. Application Data

[63] Continuation of Ser. No. 187,526, Jan. 28, 1994, Pat. No. 5,481,168.

[30] Foreign Application Priority Data

Jan. 29, 1993 [JP] Japan .................. 5-013971

[51] Int. Cl.$^6$ ........................................... H02P 7/00
[52] U.S. Cl. .................. 318/432; 318/802; 318/811
[58] Field of Search .............................. 318/432, 434, 318/798–811

[56] References Cited

U.S. PATENT DOCUMENTS

| | | | |
|---|---|---|---|
| 4,041,361 | 8/1977 | Cornell | 318/802 |
| 4,450,398 | 5/1984 | Bose | 318/803 |
| 4,567,419 | 1/1986 | Watanbe | 318/805 X |
| 4,672,288 | 6/1987 | Abbondanti | 318/803 |
| 4,815,567 | 3/1989 | Ikejima | 318/807 X |
| 4,870,334 | 9/1989 | Iwasa et al. | 318/432 |
| 5,047,704 | 9/1991 | Yamauchi | 318/801 |
| 5,481,168 | 1/1996 | Mutoh et al. | 318/432 |

FOREIGN PATENT DOCUMENTS 62-250803  10/1987  Japan .

*Primary Examiner*—David S. Martin
*Attorney, Agent, or Firm*—Evenson, McKeown, Edwards & Lenahan P.L.L.C.

[57] ABSTRACT

An electric vehicle torque controller has a torque calculating unit and an actual torque detecting unit. The calculated torque is compared with the actual torque to generate a torque compensation value, which is converted to a torque current signal. The torque current signal is used to generate a slip frequency, which is added to an output of an angular speed detector and used to set a secondary magnetic flux value. A secondary magnetic flux signal is generated according to the secondary magnetic flux value and the torque current signal. A secondary magnetic flux estimating unit generates an estimated secondary magnetic flux value, which is used to determine the exciting current. Primary motor current is controlled in response to the exciting current, the torque current, motor speed and slip value.

4 Claims, 6 Drawing Sheets

ELECTRIC VEHICLE TORQUE CONTROLLER

This is a continuation of application Ser. No. 08/187,526, filed Jan. 28, 1994, U.S. Pat. No. 5,481,168.

BACKGROUND OF THE INVENTION

This invention relates to an electric vehicle torque controller that permits efficient use of battery energy.

In the field of electric vehicles, efficient use of battery energy and maximizing the running distance per battery charge are extremely important. In the known conventional art related to this field, as described in Japanese Patent Application Laid-Open No. 250803/1987, a motor magnetic flux loss look-up table is prepared in advance, and an optimum motor magnetic flux signal which reduces the motor loss is read from the table, based on a motor torque signal determined from motor speed and a signal indicative of accelerator pedal depression. A torque current signal is calculated from the motor magnetic flux signal to control the motor accordingly, thereby reducing the motor loss.

Motor torque in an electric motor is proportional to the product of the secondary magnetic flux (motor magnetic flux) generated in the motor (secondary circuit) and the torque current flowing into the secondary circuit. Thus, there are an infinite number of combinations of secondary magnetic flux and torque current values which will yield a particular torque output. However, for each value of torque, there exists one combination which is most efficient in reducing motor losses. Thus, if driving conditions change, the magnetic flux value must be changed in such a manner as to minimize motor losses. When the torque current signal is changed, the torque current flowing into the motor's secondary circuit changes also. Especially when the load or acceleration torque is large, the torque current increases, increasing the torque current sensitivity to external disturbances. The degree of the torque current change against those disturbances is also increased.

In addition, if the magnetic flux signal is changed in response to a change of driving conditions, such as the torque reference signal, motor speed, etc., then the exciting current changes also, causing the secondary magnetic flux generated in the secondary circuit to become unstable. The secondary magnetic flux and the torque current thus interfere with each other, causing the motor torque to oscillate and the vehicle body to vibrate.

One object of the present invention is to provide a torque controller that can generate a required torque output level, with minimum primary current (motor current), and stabilize torque generation in response to a torque reference (a desired torque input value), even when the torque current becomes excessively large, such as, for example, when the vehicle is climbing a steep hill, accelerating abruptly, or operating with a heavy load.

SUMMARY OF THE INVENTION

This and other objects and advantages are achieved by the torque controller according to the invention, which comprises a motor torque detecting unit, a motor torque compensating unit to match the detected torque with a torque reference determined from the accelerator pedal position, a calculating unit to calculate a torque current signal from the compensated value of the torque signal obtained from the motor torque compensating unit, a unit to determine a secondary magnetic flux set value corresponding to the motor speed, a unit to calculate a secondary magnetic flux signal to control the secondary magnetic flux generated in the secondary circuit of the motor according to the secondary magnetic flux set value and the torque current signal, a unit to estimate the secondary magnetic flux generated in the motor's secondary circuit, and a unit to determine an exciting current signal such that the estimated secondary magnetic flux matches the secondary magnetic flux signal. In this manner, the secondary magnetic flux signal may be determined uniquely so that when a torque signal is determined, a torque equivalent to this torque signal value may always be generated in the motor.

The motor torque detecting unit detects torque generated by the motor, including transient effects that is, transient or instantaneous variations in motor torque generated when the secondary magnetic flux is unstable. When a difference is detected between the torque reference and the generated torque, the motor torque compensating unit determines a compensation value corresponding to the torque reference. In turn, the torque current signal calculating unit generates a torque current signal in response to the torque signal compensation value and the estimated secondary magnetic flux determined by a secondary magnetic flux estimating means. A secondary magnetic flux calculating unit generates the secondary magnetic flux signal by multiplying the load rate (the ratio of the torque current signal to the rated torque current) by the secondary magnetic flux set value obtained from a secondary magnetic flux setting unit. An exciting current controller generates the exciting current signal so that the estimated magnetic flux obtained by the secondary magnetic flux estimating unit follows the secondary magnetic flux signal.

The torque current signal and the exciting current signal determined as described above suppress the torque vibration, and are compensated in a manner described hereinafter, so that the required motor torque may be generated with the minimum primary current (motor current). The result then affects the primary current signal. Since the primary current is controlled according to this primary current signal, the torque can be controlled stably through the effective use of the battery power when the driving conditions are changed.

Other objects, advantages and novel features of the present invention will become apparent from the following detailed description of the invention when considered in conjunction with the accompanying drawings.

DETAILED DESCRIPTION OF THE DRAWINGS

Figure 1:
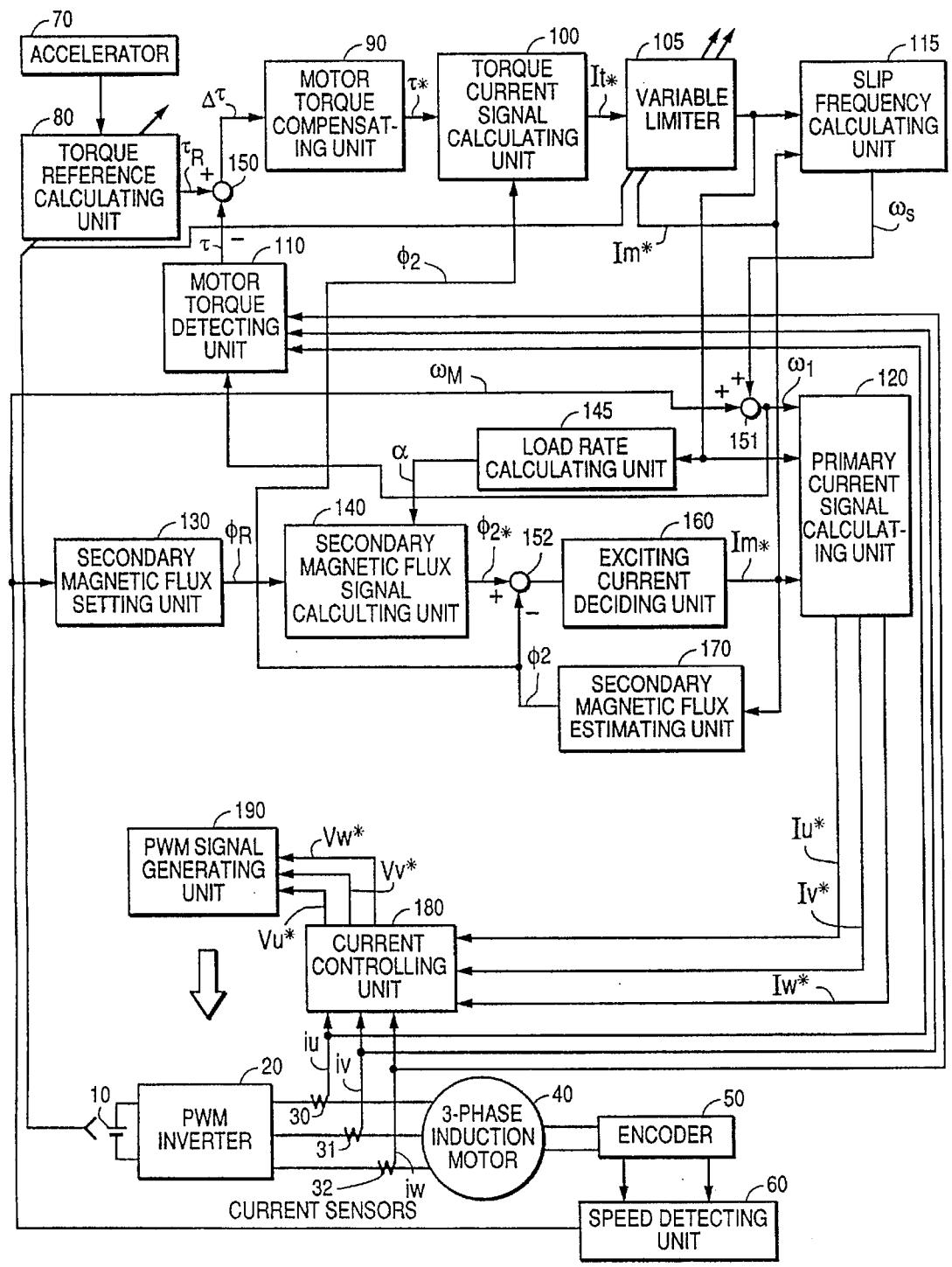
FIG. 1 is a schematic diagram of an embodiment of the present invention.

FIG. 1 shows a schematic diagram of an embodiment of an electric vehicle driving system according to the invention, which comprises a battery 10, a pulse width modulated (PWM) inverter 20 used to convert the DC voltage from the battery 10 to an AC variable frequency voltage, and a 3-phase induction motor 40 driven by the AC power from this inverter 20. The torque generated in the induction motor 40 is transmitted to the wheels (omitted in this figure) to drive the vehicle. The 3-phase AC current flowing into the primary coil (primary current) of the induction motor 40 is detected by the current sensor 30, 31, and 32. The rotational speed of the rotor of the induction motor 40 is detected by the encoder 50 connected to the rotor, and the speed detecting unit 60. The torque generated by the induction motor 40 is controlled in the manner described below, based on detected 3-phase AC current and rotational speed.

A torque reference calculator unit 80 calculates a torque reference $\tau_R$ for the torque generated in the 3-phase induction motor 40 based on the output of the accelerator pedal position detector 70. As indicated in FIG. 1, this reference $\tau_R$ is compensated when the battery voltage drops below a required value, in order to prevent the battery from being discharged excessively due to power consumption by the motor 40. The required voltage value differs among batteries, but is usually larger than the discharge ending voltage (since the required voltage can be restored by charging). The torque reference is corrected in response to deviation of the battery voltage from the specified value, based on the principal that the PWM inverter 20 generates a primary voltage proportional to the battery voltage, and the torque generated in the 3-phase induction motor 40 is proportional to the square of the primary voltage applied to the motor 40. If the motor is continuously driven when the battery voltage is below the required value, as the battery current (discharge current) increases, the torque current flowing into the secondary circuit of the motor increases also, so as to compensate for the reduction of the motor torque caused by the excess drop in the battery voltage.

Although not shown in FIG. 1, the same result can also be obtained by reducing the limit of the torque current signal according to the battery voltage if the battery voltage falls below the specified value.

The torque reference $\tau_R$ is entered to the plus terminal of the subtractor 150 and the motor torque (calculated by the motor torque detecting unit 110 using the following expression (1)) is entered to the minus terminal to obtain a difference signal $\Delta\tau$.

$$\tau = m \cdot p \cdot \frac{L_{md}^2}{(L_{md}+L_2)} \cdot I_m \cdot I_c \cdot \frac{1}{1+T_2 s} \quad (1)$$

where: $T_2 = \frac{(L_{md}+L_2)}{r_2}$ (secondary time constant);

m=number of phases
r=secondary resistance;
P=number of polar pairs;
$L_{md}$=exciting inductance;
$L_2$=secondary leakage inductance; and
s=Laplace operator.

Im (exciting current) and It (torque current) are the d and q axis components obtained by converting the $i_u$, $i_v$, and $i_w$ U-phase, V-phase, and W phase AC current detected by the current sensors 30, 31, and 32, respectively, to the d-q axis coordinates that rotate at a speed synchronously with the angular frequency $\omega_I$ of the PWM inverter 20 (shown in the expressions (2-1) and (2-2).

$$Im = i_u \cdot \cos\theta_1^* + i_v \cdot \cos\left(\theta_1^* - \frac{2\pi}{3}\right) + i_w \cdot \cos\left(\theta_1^* + \frac{2\pi}{3}\right) \quad (2\text{-}1)$$

$$It = i_u \cdot \sin\theta_1^* + i_v \cdot \sin\left(\theta_1^* - \frac{2\pi}{3}\right) + i_w \cdot \sin\left(\theta_1^* + \frac{2\pi}{3}\right) \quad (2\text{-}2)$$

where $\theta_i^* = \int \omega_I \cdot dt$

The motor torque compensating unit 90 determines a torque signal compensation value $\tau^*$ which eliminates or compensates for the difference $\Delta\tau$ received from subtractor 150. (The motor torque compensating means 90 may be, for example, a PI (proportion+integration) arrangement; that is an integrating operational amplifier with an adjustable gain. In this case, the compensating circuits to be shown in the subsequent embodiments are also PI elements). The torque current calculating unit 100 uses the torque signal compensation value $\tau^*$ and an estimated secondary magnetic value $\phi_2$ (obtained from the secondary magnetic flux estimating unit 170) to calculate a torque current signal $I_t^*$ according to expressions (3-1) and (3-2), as follows:

$$I_t^* = \left(\frac{1}{m \cdot p}\right) \cdot \left(\frac{L_{md}+L_2}{L_{md}}\right) \cdot \left(\frac{\tau^*}{\phi_2}\right) \quad (3\text{-}1)$$

$$\phi_2 = \frac{L_{md} \cdot I_m^*}{1+T_2 \cdot S} \quad (3\text{-}2)$$

where $I_m^*$ is the exciting current signal generated by the exciting current deciding unit 160.

The estimated secondary magnetic flux $\phi_2$ can also be obtained using formula (3—3) using the exciting current $I_m$ obtained from formulae (2-1) and (2-2).

$$\phi_2 = \frac{L_{md} \cdot I_m}{1+T_2 \cdot S} \quad (3\text{-}3)$$

The estimated secondary magnetic flux value obtained from formula (3-3) is closer to the real secondary magnetic flux than that obtained from formula (3-2). FIG. 1 shows one example of the invention where the secondary magnetic flux is estimated by using only formula (3-1).

The torque current signal $I_t^*$ is entered to the slip frequency calculator unit 115 through the variable limiter 105, which is controlled in inverse proportion to an exciting current signal $I_m^*$ generated by an exciting current deciding unit 160 (described hereinafter). That is, the limiting value increases as the magnetic flux weakens, and the range of the torque current signal is thus widened. When the exciting current becomes small, the range of the amplitude of the primary current is reduced by the reduction of the secondary magnetic flux, which leads in turn to a reduction of the capacity of the inverter. If a large load torque is applied to the motor under such circumstances, the torque response is degraded because the inverter lacks the capacity to transmit a sufficiently large primary current to the motor. The function of the variable limiter 105, therefore is to limit the torque current signal $I_t^*$ to a maximum value that is inversely proportional to the secondary magnetic flux.

The slip frequency calculator unit 115 calculates a slip angular frequency $\omega_s$ using to the following expressions (4-1) or (4-2):

$$\omega_s = \left(\frac{r_2}{L_{md}+L_2}\right) \cdot \left(\frac{I_t^*}{I_m^*}\right) \quad (4\text{-}1)$$

$$\omega_s = r_2 \cdot \left(\frac{L_{md}}{L_{md}+L_2}\right) \cdot \left(\frac{I_t^*}{\phi_2}\right) \quad (4\text{-}2)$$

where $\phi_2$: secondary magnetic flux estimated by using expression (3-2) or (3-3).

Formula (4-2) should be used when the transient motor torque characteristics must be improved as the motor generates the torque according to the secondary magnetic flux. In the embodiment of FIG. 1, the slip angular frequency $\omega_s$ is determined using formula (4-1).

The calculated slip angular frequency $\omega_s$ is then added to the induction motor rotational speed $\omega_M$ detected by the speed detecting unit 60 in the adder 151 as shown in the expression (5), to obtain the angular frequency $\omega_I$ of the PWM inverter 20, which is input to the primary current signal calculator unit 120 as the target angular frequency of the primary current signal.

$$\omega_I = \omega_s + \omega_M \qquad (5)$$

A secondary magnetic flux setting unit 130 generates a secondary magnetic flux set value $\phi_R$ based on the detected rotational speed $\omega_M$ of the induction motor 40, according to the following expressions (6-1) and (6-2):

$$0 \leq \omega_M \leq \omega_{M0} \quad \phi_R = (\phi_2)\text{rated} \qquad (6-1)$$

$$\omega_{M0} < \omega_M \quad \phi_R = \left(\frac{\omega_{R0}}{\omega_M}\right) \cdot (\phi_2)\text{rated} \qquad (6-2)$$

where ($\phi_2$) rated: Rated secondary magnetic flux, and where $\omega_{M0}$: Base motor rotational speed. As can be seen from expressions 6-1 and 6-2, the set motor torque is thus kept constant until the motor speed exceeds $\omega_{M0}$. In this case $\phi_R$ is the maximum reference value related to secondary magnetic flux, which permits the motor to generate the maximum torque at that speed.

A load rate $\alpha$ is calculated by the load rate calculator unit 145 from the ratio of the torque current signal "$I_t^*$" output from the variable limiter 105 to the rated torque current "$(I_t)$rated", according to the following expression 7:

$$\alpha = \frac{I_t^*}{(I_t)\text{rated}} \qquad (7)$$

Based on this load rate $\alpha$, a secondary magnetic flux signal $\phi_2^*$ is generated by the secondary magnetic flux signal calculating unit 140 to control the secondary magnetic flux in the secondary circuit of the induction motor 40.

The secondary magnetic flux set value $\phi_R$ is input to the secondary magnetic flux signal calculating unit 140, which generates the secondary magnetic flux signal $\phi_2^*$ according to the following expression (8).

$$\phi_2^* = (\alpha \cdot \phi_R) + \phi_{R0} \qquad (8)$$

where $\phi_{R0} = (I_{m0}) \cdot L_{md}$. Thus, as can be seen from expression 8, the secondary magnetic flux signal $\phi_2^*$ (and hence the motor torque) is generated in response to the torque load rate $\alpha$; this is based on the proposition that it is not always necessary to generate the maximum secondary magnetic flux when the load torque is less than the rated torque.

The quantity $\phi_{R0}$ in expression 8 above (the no load secondary magnetic flux signal, which is assumed as the magnetic flux generated in the motor 40 when there is no load), is a fixed parameter of the induction motor 40, and is not influenced by the torque current signal. It is selected in order to minimize the battery energy loss, and is usually less than 20% of the rated magnetic flux. It thus serves to prevent the torque Current flowing into the secondary circuit from being excessive when a load is suddenly applied to the wheels with the motor in the no-load status.

Figure 2:
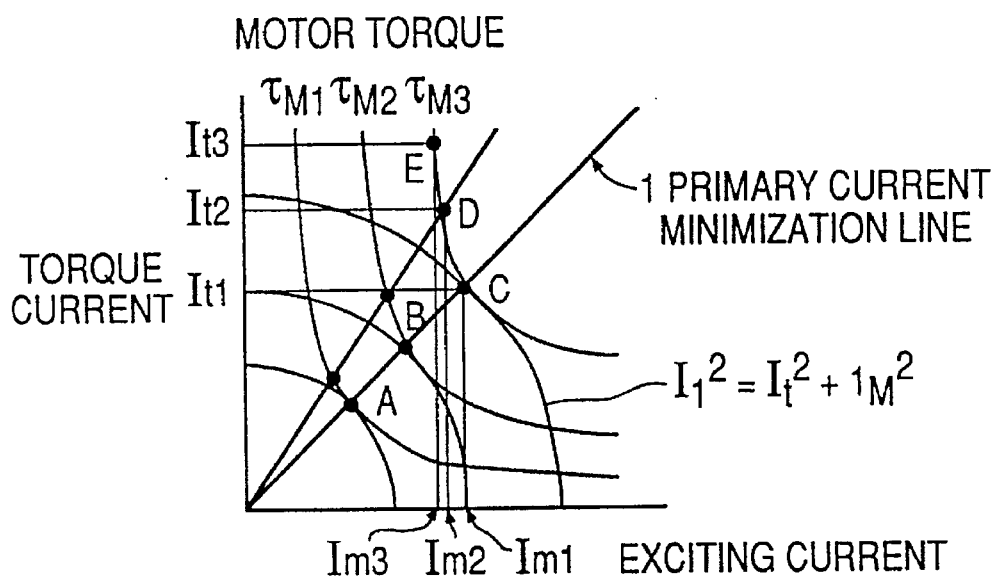
FIG. 2 shows the relationship between torque current and exciting current (secondary magnetic flux) for minimizing the primary current.

The principle that the required torque is determined in relation to the torque current signal so that it may be generated with the minimum primary current (the current flowing into the induction motor) is illustrated in FIG. 2. The primary current "$I_I$" can be calculated as shown in the expression (9) using the exciting current "$I_m$" ($=\phi_2/L_{md}$) and the torque current "$I_t$" used to generate the secondary magnetic flux $\phi_2$:

$$I_I^2 I_t^2 + I_m^2 \qquad (9)$$

On the other hand, the torque $\tau$ generated in the induction motor 40, as shown in expression (1) above is proportional to the product of the torque current and the exciting current (or the secondary magnetic flux), and is thus represented in FIG. 2 as a hyperbola. For each value of motor torque $\tau_{M1}$, $\tau_{M2}$, and $\tau_{M3}$ as shown in FIG. 2, it can be seen that the points A, B, and C, respectively represent the minimum necessary primary current. That is, for example, it can be seen from a comparison of $I_m$ and $I_t$ for points D and E relative to point C that while $I_t$ increases substantially for points D & E, $I_m$ decreases by only a small amount; hence $I_I$ (expression 9) increases for points D and E relative to point C. Thus, it can be seen from FIG. 2 that if the torque current and the exciting current (or the secondary magnetic flux) are kept equal, the required torque can always be generated with the minimum primary current, and the electric vehicle can be driven with the minimum battery energy.

This principle is embodied in the apparatus of FIG. 1, for example by adjusting the gain of the exciting current deciding unit 160 (which may be, for example, a PI compensator unit—that is, an integrating operational amplifier having an adjustable or predeterminable gain). Since $\phi_2^*$ (input to PI unit 160) is proportional to $I_t^*$ (when motor speed is constant), the gain of PI unit 160 can be adjusted so that $I_t^* = I_m^*$, and as noted above, maximum efficiency is achieved—at least for an ideal motor in which $\phi_{R0}=0$.

Figure 3:
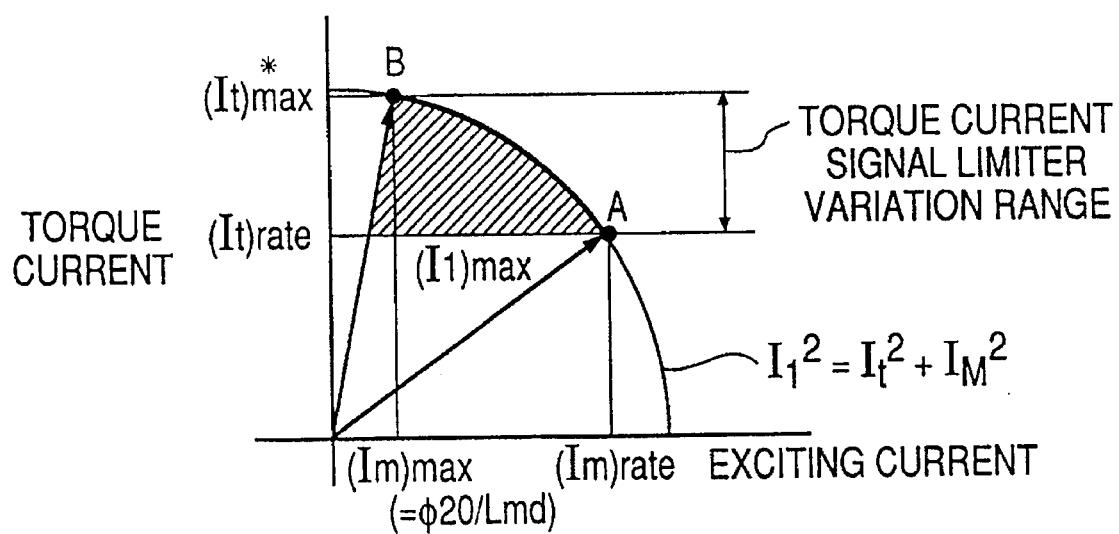
FIG. 3 shows how the torque current limiter is changed while the primary current max value is fixed.

When the torque current decreases, the secondary magnetic flux is also weakened and the exciting current is reduced accordingly. If the load is increased abruptly while the motor is operating in this status, then the torque current is also increased. If the limit imposed by the torque current signal limiter 105 is kept at the rate value ($I_{t0}$) max, however, the required motor torque cannot be generated; and the decreased current cannot be restored. As noted previously, to prevent this, the torque current signal limit ($I_t$) max* must be varied according to expression (10) so that the torque current may always flow up to the primary current max value as shown in FIG. 3.

$$(I_t)\text{max}^* = (I_I)\text{max} \cdot \sin(\arccos [I_m^*/(I_I)\text{max}]) \qquad (10)$$

Referring again to FIG. 1, the exciting current signal Im* is generated by the exciting current control unit 160 (which may be a PI compensator, as noted previously) so as to compensate the difference between the secondary magnetic flux $\phi_2$ (estimated by the secondary magnetic flux estimating unit 170) and the secondary magnetic flux signal $\phi_2^*$ (output by the secondary magnetic flux signal calculating unit 140, as described above). This is accomplished by means of a conventional closed loop circuit, in which the output value $I_m^*$ is fed back to the secondary magnetic flux estimating unit 170, and the value of $\phi_2$ thus determined is compared with $\phi_2^*$ in subtractor 152. For this purpose, the estimated value $\phi_2$ is determined by the estimating unit 170, according to the following expression (11):

$$\phi_2 = \frac{L_{md} \cdot I_m^*}{(1 + T_2 \cdot s)} \qquad (11)$$

where $T_2 = (L_{md} + L_2)/r_2$; $r_2$ being the secondary resistance.

The primary current signal calculating unit 120 receives the three input signals $\omega_I$, $I_t^*$ and $I_m^*$ (generated in the manner described above) and generates the 3-phase AC current signals $i_u^*$, $i_v^*$, and $i_w^*$ shown in the following expressions (12-1), (12-2) and (12-3):

$$i_u^* = I_1 \cdot \cos(\Theta_1^* + \Psi) \qquad (12\text{-}1)$$

$$i_v^* = I_1 \cdot \cos\left(\Theta_1^* + \Psi - \frac{2\pi}{3}\right) \qquad (12\text{-}2)$$

$$i_w^* = I_1 \cdot \cos\left(\Theta_1^* + \Psi + \frac{2\pi}{3}\right) \qquad (12\text{-}3)$$

where $\Theta_I^*$ and $\psi$ are found by the expressions (13) and (14):

$$\Theta_I^* = \int \omega_I \cdot dt \qquad (13)$$

$$\psi = \arctan(I_t^*/I_m^*) \qquad (14)$$

The three phase AC current signals $i_u^*$, $i_v^*$, and $i_w^*$ generated by the primary current signal calculating unit 120 are entered into the current control unit 180, which compares them with the fed back U-phase, V-phase, and W-phase AC currents $i_u$, $i_v$, and $i_w$ detected by the current sensors 30, 31, and 32, and generates AC voltage signals $V_u^*$, $V_v^*$, and $V_w^*$ in a conventional closed loop arrangement. That is, the signals $V_u^*$, $V_v^*$, and $V_w^*$ are entered to the PWM signal generating unit 190, and are used to generate pulse width modulated waves which are compared with the carrier (not shown in the figure) generated in the PWM signal generating unit 190 to generate the PWM signal. This PWM signal is supplied to the PWM inverter 20 to generate a variable frequency/voltage AC power supply to drive the 3-phase induction motor 40.

In this embodiment, an exciting current sufficient to generate the required torque, with the minimum primary current, flows into the induction motor. Thus, the battery energy efficiency is improved, extending the running distance per battery charge. In addition, if an abrupt external disturbance is applied to the wheels when there is no load, the secondary magnetic flux signal increases at the same speed as that of the torque current signal. As a result, the magnetic flux is generated in the induction motor at high speeds, and stable torque control is thus possible.

Figure 4:
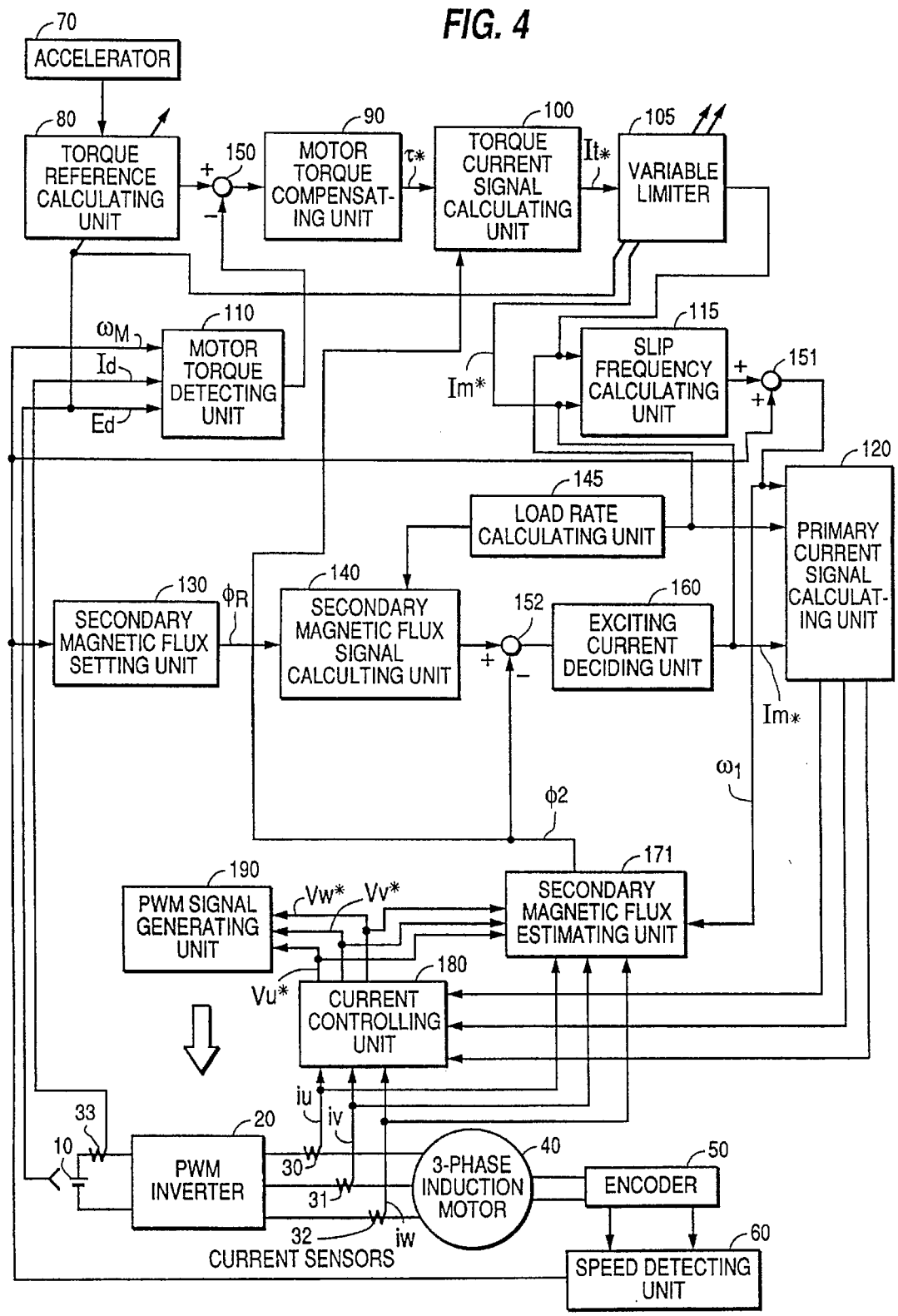
FIG. 4 is a schematic diagram of another embodiment in the invention.

FIG. 4 shows another embodiment of this invention, which differs from the embodiment of FIG. 1 in the configuration of the secondary magnetic flux estimating unit 171 and the motor torque detecting unit 110. This section will therefore explain only the differences.

In the embodiment of FIG. 4, the secondary magnetic flux $\phi_2$ is estimated by secondary magnetic flux estimating unit 171 based on the U-phase, V-phase, and W-phase AC currents $i_u$, $i_v$, and $i_w$ detected by the current sensors 30, 31, and 32 and the voltage signals $V_u^*$, $V_v^*$, and $V_w^*$ output from the current controlling unit 180 using expression (15).

$$\phi_2 = \phi_u \cdot \cos\Theta_1^* + \phi_v \cdot \cos\left(\Theta^* - \frac{2\pi}{3}\right) + \phi_w \cdot \cos\left(\Theta_1^* + \frac{2\pi}{3}\right) \qquad (15)$$

In this expression, $$\phi_j = \int (V_j - r_1 \cdot i_j) dt - L_1 \cdot i_j$$

where $V_j = K_p \cdot V_j^*$ (j=u, v, and w); $V_j$ being the primary voltage estimated from the voltage signal $V_u^*$, $V_v^*$, and $V_w^*$, and $K_p$ being a proportionality constant related to the battery voltage.

This method estimates the secondary magnetic flux from the voltage signal and the AC currents $i_u$, $i_v$, and $i_w$. The detected result is more accurate than that in the embodiment shown in FIG. 1.

The motor torque $\tau$ is calculated in FIG. 4 by motor torque detecting unit 110 according to expression (16), using the DC current $I_d$ flowing into the PWM inverter detected by the current sensor 33, the DC voltage Ed of the battery 10, and the rotational speed $\omega_M$ of the induction motor 40, which is detected by the speed detecting unit 60.

$$\tau = E_d I_d / \omega_M \qquad (16)$$

This method effectively simplifies torque detection. Secondary magnetic flux in this embodiment can of course also be estimated in the same manner as in the embodiment of FIG. 1.

Figure 5:
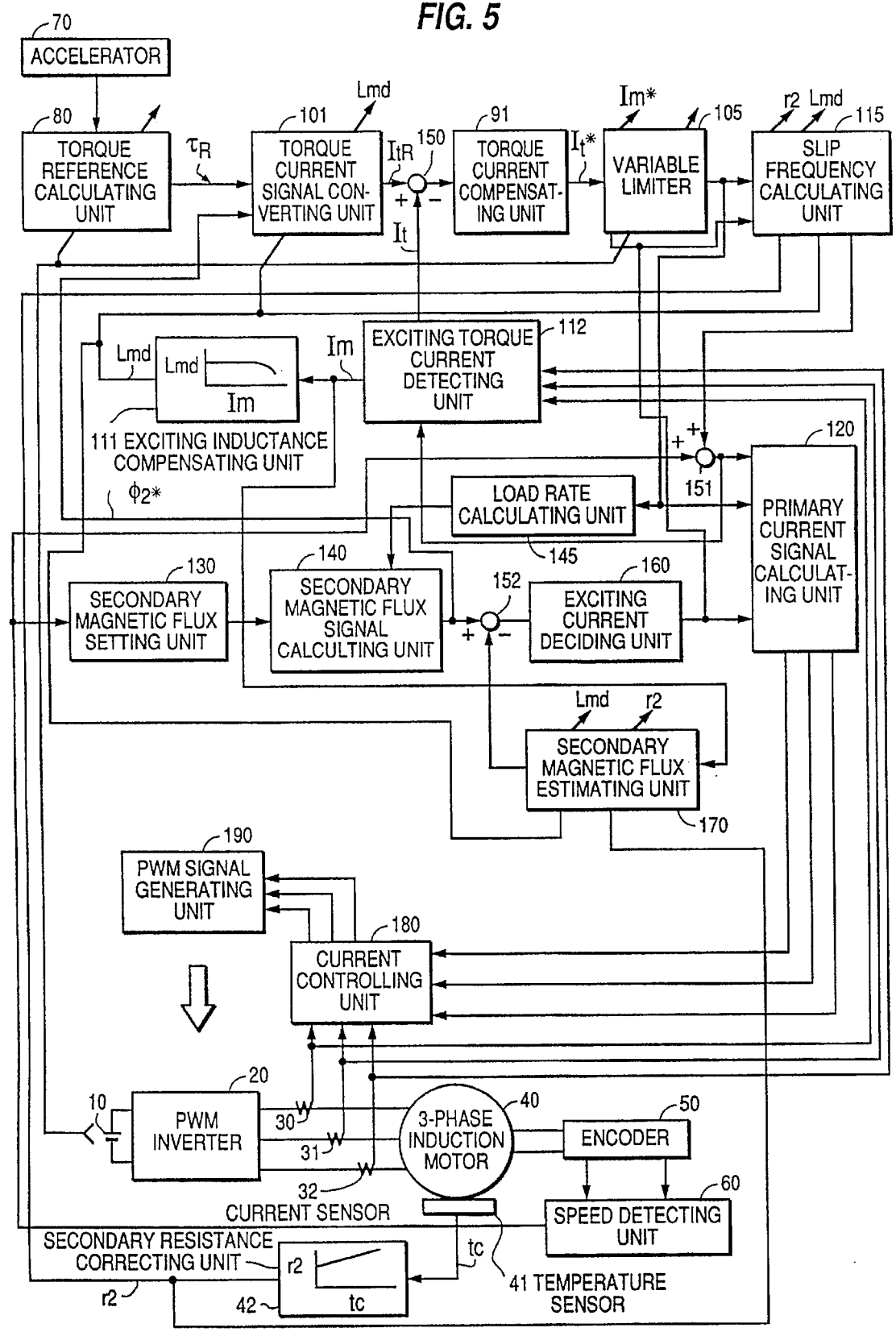
FIG. 5 is a schematic diagram of still another embodiment in the invention.

FIG. 5 shows yet another embodiment of the invention, which includes an arrangement for stabilizing torque control. In this embodiment, the torque current $I_t$ and the exciting current $I_m$ are detected and used to control the torque. Since this embodiment has a secondary resistance correcting unit and an exciting inductance unit, the exciting current signal $I_m^*$, the torque current signal $I_t^*$, and the slip angular frequency $\omega_s$ can be obtained accurately when those parameters (secondary resistance and exciting inductance) are changed. The torque reference $\tau_R$ is first converted to a torque current set value "$I_{tR}$", and compared with the actual torque current $I_t$. The result is used by torque current compensating unit 90 to generate a torque current signal $I_t^*$ such that the torque current $I_t$ of the induction motor 40 follows the torque current signal set value "$I_{tR}$". Thus, the torque is controlled according to $I_t^*$. Once again, only the differences between the embodiments of FIGS. 1 and 5 will be explained below.

The torque current signal set value "$I_{tR}$" is calculated by the torque current signal converting unit 101 using expression (17), based on the torque signal $\tau_R$ output from the torque signal calculating unit 80 and the secondary magnetic flux signal $\phi_2^*$ obtained from the secondary magnetic flux signal calculating unit 140.

$$I_{tR} = \frac{k \cdot \tau_R}{\phi_2^*} \qquad (17)$$

$$\text{where } k = \frac{(L_{md} + L_2)}{m \cdot p \cdot L_{md}}$$

So long as the induction motor 40 is driven in the linear area in which the exciting inductance $L_{md}$ is not saturated, this calculation is satisfactory, and requires no modification. However, in case of an electric vehicle, the magnetic flux generator is apt to be made small in order to reduce the weight of the motor, and in the area in which a large torque is required, the magnetic circuit can become saturated so that the exciting inductance value becomes lower than normal. In order to deal with this situation, the exciting inductance compensating unit 111 determines when an overexcited condition exists, based on the exciting current $I_m$ determined (by unit of expression 2-1 above) in the exciting/torque current detecting unit 112, and finds the exciting inductance $L_{md}$ based on a predetermined pattern stored therein, which corresponds to the overexcited status. "$I_{tR}$" is then calculated by torque current signal converting unit 101 as noted above, based on the corrected value of $L_{md}$.

$I_{tR}$ is supplied to the plus terminal of the adder/subtractor 150, while the torque current $I_t$ determined (by unit of expression 2-2 above) in the exciting/torque current detecting unit 112 is supplied to the minus terminal. The torque current signal $I_t^*$ is then generated in torque current compensating unit 91 to compensate the deviation $\Delta I_t$ of the torque current signal received from the adder/subtractor 150. The torque current compensating unit 91 is composed of a PI compensator which generates torque current signal It* such that the torque current $I_t$ detected by the exciting/torque current detecting unit 112 follows the torque current signal $I_{tR}$. The motor torque of the induction motor 40 is controlled using the torque current signal It*, and the exciting current signal Im* determined by the exciting current deciding unit 160 so that a secondary magnetic flux $\phi_2$ follows the magnetic flux signal $\phi_2^*$ generated by the secondary magnetic flux signal calculating unit 140.

The secondary magnetic flux $\phi_2$ of induction motor 40 is estimated by secondary magnetic flux estimating unit 170 using expression (18), based on the exciting current $I_m$ obtained from the exciting/torque current detecting unit 112:

$$\phi_2 = \frac{L_{md} \cdot I_m}{(1 + T_2 \cdot s)} \quad (13)$$

In this expression, $T_2$ is a secondary time constant, which is related to the exciting inductance $L_{md}$ and the secondary resistance $r_2$ as follows:

$$T_2 = \frac{(L_{md} + L_2)}{r_2} \quad (18a)$$

In case of an electric vehicle, it may occasionally be necessary to run with an overload, under high ambient temperatures. When the temperature in the induction motor 40 rises, however, the secondary resistance $r_2$ increases as well. In order to compensate for this phenomenon, the temperature sensor 41 detects the temperature $t_c$ in the induction motor 40, which is used to calculate the secondary resistance $r_2$ in the secondary resistance correcting unit 42, which in turn is provided to the secondary magnetic flux estimating unit 170 and to the slip frequency calculating unit 115. For this purpose, the secondary resistance correcting unit has stored therein a predetermined set of values of $r_2$ as a function of temperature.

The secondary magnetic flux $\phi_2$ determined as described above is input to the minus terminal of an adder/subtractor 152, and the secondary magnetic flux signal $\phi_2^*$ (obtained in the same manner as in the embodiment shown in FIG. 1) is entered to the plus terminal. The difference value $\Delta \phi_2$ obtained from the adder/subtractor 152 is entered to the exciting current control unit 160 (a PI compensation unit), where the exciting current signal $I_m^*$ necessary to correct the deviation $\Delta \phi_2$ is determined in the same manner as before.

In this embodiment, the torque current $I_t$ and the exciting current $I_m$ obtained from the 3-phase AC currents $i_u$, $i_v$, and $i_w$ flowing into the induction motor 40 are used directly to control the torque. Thus, the torque controller according to the invention can control the torque stably against external disturbances, even when the motor constant is changed due to changes in the operating status of the vehicle. Moreover, the correction of those parameters can achieve the same effect as each embodiment shown in FIGS. 1, 4, and 6 (below).

Figure 6:
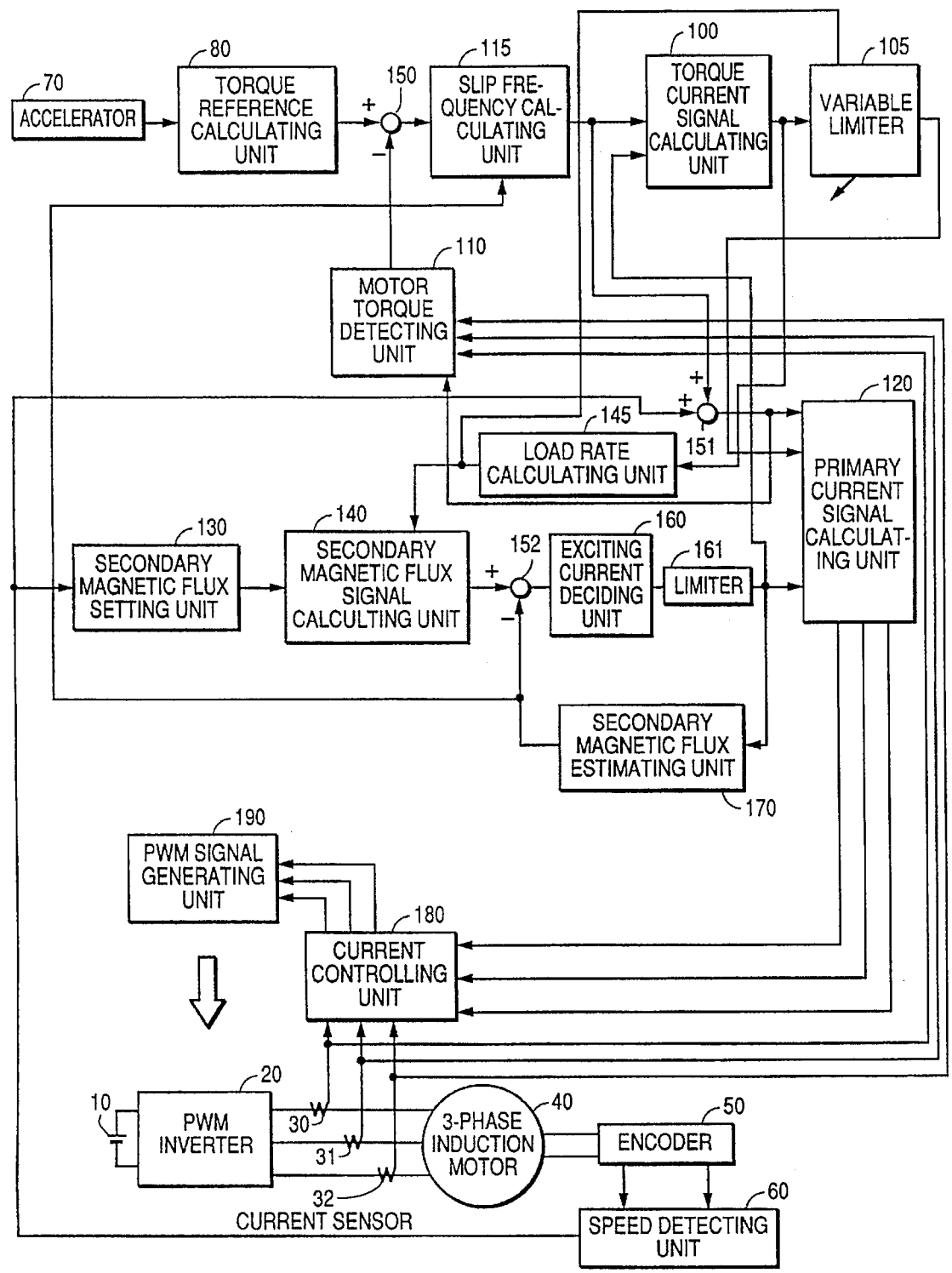
FIG. 6 is a schematic diagram of yet another embodiment in the invention.

FIG. 6 shows still another embodiment of the invention which differs from that of FIG. 1 in that the deviation $\Delta \tau$ between the torque reference $\tau_R$ and the motor torque $\tau$ is input directly into the slip frequency calculating unit 115. The slip frequency calculating unit 115 includes a PI compensator, which automatically generates the torque signal $\tau^*$ based on the deviation $\Delta \tau$ between $\tau_R$ and $\tau$, and the slip frequency calculating unit calculates the slip angular frequency $\omega_s$ by using $\tau^*$ and the secondary magnetic flux $\phi_2$, based on the following formula.

$$\omega_s = \frac{1}{mp} \cdot r_2 \cdot \left( \frac{\tau^*}{\phi_2^2} \right) \quad (19)$$

After calculation of the slip angular frequency, the torque current signal calculating unit 100 calculates the torque current signal $I_t^*$ by using the slip angular frequency $\omega_s$ and the exciting current signal $I_m^*$ obtained from the exciting current deciding unit 160, based on the formula (20).

$$I_t^* = \left( \frac{L_{md} + L_2}{r_2} \right) \cdot I_m^* \cdot \omega_s \quad (20)$$

In this manner, the accuracy of the initial slip angular frequency calculation to correct external disturbances for controlling the torque is improved. (Since the value of the slip angular frequency is small compared with other signals such as the torque current signal, it can be calculated more accurately by using the torque deviation $\Delta \tau$.) When the secondary magnetic flux is constant, the torque compensation, the torque current signal, and the slip angular frequency can be calculated in the same manner as in the embodiment of FIG. 1, and slip angular frequency accuracy is not significantly reduced. However, if the secondary magnetic flux is reduced substantially, then the accuracy of the slip angular frequency may be impaired. The slip angular frequency in particular becomes progressively smaller as the load approaches zero, and torque control stability is therefore degraded. To remedy this deficiency, in the embodiment of FIG. 6 the configuration is changed so that the slip angular frequency is obtained directly from the torque deviation, which is more accurate. In this manner, the torque can be controlled stably, even when the secondary magnetic flux is reduced.

Figure 7:
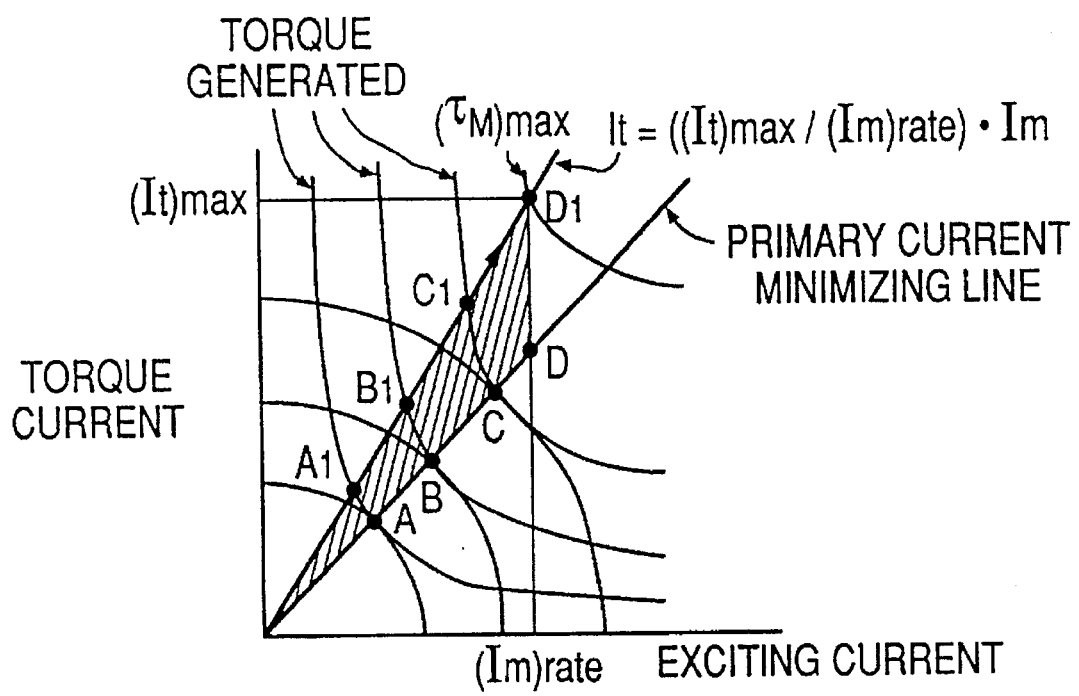
FIG. 7 depicts the practical operation ranges of the exciting current and the torque current.

FIG. 7 shows the practical relationship between the torque current and the exciting current. In an electric vehicle, the motor size must be minimized; for this reasons, such motors are designed so that a large torque current is obtained while the exciting current to generate the torque is kept small. In this case, the torque current/exciting current ratio is greater than 1, and will usually be in the range 4 to 6. As shown in FIG. 7, therefore, if the exciting current and the torque current are increased exactly along the minimized primary current line, then the exciting current reaches the rated value ($I_m$)rate (corresponding to point D) before the torque current reaches the maximum value ($I_t$) max. If the exciting current exceeds ($I_m$)rate, however, it becomes overexciting; that is, the exciting inductance is reduced, the primary current increases, and the motor overheats or the inverter trips, which must be avoided. For this reason, both the exciting current and the torque current are controlled to follow the minimized primary current line (as described previously) until the exciting current reaches the rated value. When the exciting current reaches the rated value, it is fixed at that value, and only the torque current is increased until it reaches the allowable value ($I_t$)max (point $D_t$). This is accomplished by unit of the limiter 161 which limits the value of $I_m^*$ output by the exciting current deciding unit 160, so that it cannot exceed ($I_m$) rate.

There is also another method in which it is taken into account that the rated exciting current ($I_m$) rate is smaller than the torque current ($I_t$)max. There is not much difference between both currents even when they are increased along the $A_t \ldots D_t$ lines shown in FIG. 7. It is found that the same effect as that mentioned above can also be obtained in this manner. To reduce the motor loss, therefore, it is necessary not only to minimize the resistive loss, but also to reduce other losses such as the magnetic loss, etc. Actually, it would be most effective to make both the currents flow in the shaded triangle area shown in FIG. 7, considering those losses.

The process mentioned above can be represented by the expression (21) as shown below:

$$\phi_2^* = \beta \cdot I_t^* + \phi_{R0} \qquad (21)$$

$$L_{md} \geq \beta \geq \frac{(I_m)\text{rated} \cdot L_{md} - \phi_{R0}}{(I_t)\text{max}}$$

In this case, usually the $\phi_{R0}$ value, as mentioned above, is less than 20% of the rated secondary magnetic flux in order to realize efficient driving. In order to further improve the efficiency, it is necessary to set the $\phi_{R0}$ value to 0 when the motor speed reaches 0. In this case, the $\phi_2^*$ value can be increased by having the torque signal delay until the starting magnetic flux is stabilized, or until it is necessary to compensate the torque current ($I_t$) max as shown in the expression (10) to increase the $\phi_2^*$ value and make the exciting current flow quickly.

Since this invention allows the battery energy to be used effectively, the electric vehicle's running distance per battery charging can be extended considerably.

In addition, the torque controller of this invention can control the torque smoothly in response to depression of the accelerator pedal when the motor torque is changed due to an external disturbance applied to the wheels, climbing a hill, or abrupt acceleration, realizing comfortable control of the electric vehicle.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A torque controller for an electric vehicle motor capable of controlling instantaneous torque of said motor in response to a changing accelerator pedal position, comprising:
   a power supply unit including a pulse width modulation inverter with a gate input for controlling a three phase A.C. primary current flowing from said inverter to a primary winding of said electric vehicle motor;
   means for determining an instantaneous exciting current and an instantaneous torque current flowing through said motor, separately as a function of said three phase A.C. primary current;
   an instantaneous torque calculation unit for calculating an instantaneous torque as a function of said exciting current and said torque current;
   a torque command calculator which calculates a torque command in response to said accelerator pedal position;
   a difference unit for determining an instantaneous difference between said torque command and said instantaneous torque;
   a torque command compensation unit for generating a torque compensation value to eliminate said difference between said torque command and said instantaneous torque;
   a primary current signal determination unit which determines said primary current to flow through said primary winding of said motor in response to said torque compensation value generated by said torque command compensation unit, and outputs a primary current command signal indicative thereof; and
   a pulse width modulation signal generating unit having an output coupled to said gate input of said inverter, and generating a pulse width modulation signal which controls said power supply unit to provide primary current to conform to said primary current command signal.

2. Torque controller according to claim 1 wherein said instantaneous torque calculation unit determines said instantaneous torque in response to at least one of magnitude and phase of said primary current.

3. A torque controller for an electric vehicle motor comprising:
   a pulse width modulation inverter having an output coupled to a primary winding of said motor, with a gate input for controlling a three phase A.C. current which flows from said inverter to said primary winding;
   means for determining an instantaneous exciting current and an instantaneous torque current flowing to said primary winding based on said three phase A.C. current;
   a motor torque detecting unit for generating a motor torque signal indicative of an instantaneous torque of said motor based on said exciting current and said torque current;
   a torque reference calculator for generating a torque reference value in response to an input command signal;
   a comparing unit coupled to receive said torque reference value and said motor torque signal, and generate a torque difference signal indicative of a difference between instantaneous values of said torque reference value and said motor torque signal;
   means for generating three phase A.C. current signals responsive to instantaneous values of said torque difference signal;
   a current control unit responsive to said A.C. current signals for generating three phase A.C. voltage signals indicative of instantaneous values thereof; and
   a pulse width modulator coupled to receive said A.C. voltage signals and generate a plurality of pulse width modulated signals indicative of instantaneous values thereof, said pulse width modulated signals being provided to said gate input of said inverter to control said three phase A.C. current.

4. A torque controller for an electric vehicle motor comprising:
   a torque command calculator for calculating a torque command in response to a changing accelerator pedal position;
   a unit for determining an exciting current and a torque current, based on an instantaneous primary current, flowing through said motor;
   a secondary magnetic flux calculator for calculating a secondary magnetic flux based on said exciting current;
   an instantaneous torque unit for determining an instantaneous torque from said secondary magnetic flux and said torque current;
   a torque difference unit for determining an instantaneous difference between said torque command and said instantaneous torque;
   a torque command compensating unit which determines a torque command compensation amount to reduce said instantaneous torque difference to zero;

a torque current command unit which calculates a torque current command from said torque command compensation amount obtained by said torque command compensating unit and said secondary magnetic flux;

means for generating an exciting current command which provides a maximum torque generation efficiency corresponding to said torque current command; and a pulse width modulation generator for generating a pulse width modulation signal to be applied to a pulse width modulation inverter which generates a primary voltage to be applied to a primary winding of said electric vehicle motor;

whereby the instantaneous torque of the electric vehicle motor is controlled in response to the changing acceleration pedal position.

* * * * *